United States Patent
Bastioli et al.

(10) Patent No.: US 10,968,345 B2
(45) Date of Patent: Apr. 6, 2021

(54) POLYESTER COMPOSITION

(75) Inventors: Catia Bastioli, Novara (IT); Luigi Capuzzi, Novara (IT); Tiziana Milizia, Novara (IT); Roberto Vallero, Borgo D'Ale (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 13/996,821

(22) PCT Filed: Dec. 22, 2011

(86) PCT No.: PCT/EP2011/073856
§ 371 (c)(1),
(2), (4) Date: Jun. 21, 2013

(87) PCT Pub. No.: WO2012/085238
PCT Pub. Date: Jun. 28, 2012

(65) Prior Publication Data
US 2013/0281560 A1 Oct. 24, 2013

(30) Foreign Application Priority Data
Dec. 22, 2010 (IT) .......................... MI2010A002362

(51) Int. Cl.
*C08L 67/02* (2006.01)
*C08J 5/18* (2006.01)
*C08L 67/04* (2006.01)

(52) U.S. Cl.
CPC ................. *C08L 67/02* (2013.01); *C08J 5/18* (2013.01); *C08L 67/04* (2013.01); *C08J 2367/02* (2013.01); *C08J 2367/04* (2013.01)

(58) Field of Classification Search
CPC ...... C08L 67/02; C08L 67/04; C08L 2666/02; C08L 2666/18; C08L 3/02; C08L 1/02; C08L 2201/06; C08L 93/00; C08L 101/00; C08L 101/16; C08L 67/025; C08G 63/181; C08G 63/199; C08G 63/672; C08G 63/183; C08J 2367/02; C08J 2367/04; C08J 5/18
See application file for complete search history.

(56) References Cited

U.S. PATENT DOCUMENTS

| | | | | |
|---|---|---|---|---|
| 2003/0088033 | A1* | 5/2003 | Shelby | B29C 61/003 525/444 |
| 2005/0163986 | A1* | 7/2005 | Marlow et al. | 428/220 |
| 2011/0282020 | A1* | 11/2011 | Sipos | 526/190 |
| 2012/0220680 | A1 | 8/2012 | Bastioli et al. | |

FOREIGN PATENT DOCUMENTS

| | | |
|---|---|---|
| CN | 102597050 A | 7/2012 |
| JP | 2008-291244 * | 12/2008 |
| WO | WO-2007/052847 A1 | 5/2007 |
| WO | WO-2009/135921 A1 | 11/2009 |
| WO | WO-2010/077133 A1 | 7/2010 |

OTHER PUBLICATIONS

Medvedeva et al "Mixed polyesters of ethylene glycol with 295-furandicarboxylic and terephthalic acids", Feb. 1963.*
Tensile Test Methods for Plastics: ASTM D638 : Shimadzu (Shimadzu Corporation)—printed on Jun. 2, 2019 (Year: 2019).*
Masahido Okada et al., "Biodegradable polymers based on renewable resources. III. Copolyesters composed of 1,4:3,6-dianhydro-D-glucitol, 1,1-bis(5-carboxy-2-furyl)ethane and aliphatic dicarboxylic acid units", Journal of Applied Polymer Science, vol. 74, 3342-3350 (1999).

* cited by examiner

*Primary Examiner* — Ling Siu Choi
*Assistant Examiner* — Gennadiy Mesh
(74) *Attorney, Agent, or Firm* — Polsinelli PC

(57) ABSTRACT

A polymer composition comprising at least two polyesters having improved mechanical properties including a good balance between ultimate tensile strength, elastic modulus and elongation on failure. In particular, the composition comprises from 1 to 99% by weight of at least one aromatic polyester (AP) comprising units from a diol component and units from an acid component, the units from the acid component comprising from 70 to 100 mol % of repeating units from at least one heterocyclic polyfunctional aromatic acid of renewable origin and from 99 to 1% by weight of at least a second aliphatic-aromatic polyester (AAPE). This composition is suitable for producing articles such as films, moulded objects, thermoformed objects or expanded articles. The heterocyclic aromatic acid is 2,5-furandicarboxylic acid and the aliphatic-aromatic polyester is biodegradable and is a copolyester comprising repeating units from aromatic acid of the phthalic acid type, aliphatic diacids, and aliphatic diols.

7 Claims, No Drawings

POLYESTER COMPOSITION

CROSS REFERENCE TO RELATED APPLICATIONS

This application is a National Phase filing under 35 U.S.C. § 371 of PCT/EP2011/073856 filed on Dec. 22, 2013; and this application claims priority to Application No. MI2010A002362 filed in Italy on Dec. 22, 2013 under 35 U.S.C. § 119; the entire contents of all are hereby incorporated by reference.

This invention relates to a polymer composition comprising at least two polyesters having improved mechanical properties, in particular good balancing between ultimate tensile strength, elastic modulus and elongation on fracture. This composition is particularly suitable for the production of manufactured articles such as for example films, moulded objects, thermoformed objects or expanded articles.

Over the years polymer materials have become increasingly widespread as a result of their versatility, their ability to be easily processed and their low cost. Their increasing use in increasingly more technologically advanced sectors of application, however, requires a continuous development of new materials having increasingly better mechanical properties and performance during use, which are very often apparently irreconcilable; for example high elastic moduli coupled with excellent elongation on fracture and ultimate tensile strengths or good workability characteristics associated with a high continuing operating temperature.

The widespread use of conventional polymer materials has also resulted in the occurrence of ever-increasing environmental problems associated with the consumption of resources (feedstocks) originating from non-renewable carbon.

There is therefore the problem of identifying new polymer materials which are capable of ensuring high performance during use, a good balance between mechanical properties and in particular between ultimate tensile strength, elastic modulus and elongation on fracture, good workability properties associated with high continuous operating temperatures and the ability to reduce environmental problems associated with the consumption of resources (feedstock) originating from non-renewable carbon.

Starting from the technical problem set out above it has now been surprisingly found that it is possible to obtain a new polymer composition having improved mechanical properties which is capable of significantly reducing environmental impact in terms of consumption of non-renewable carbon resources by suitably selecting the nature and composition range of the polymers.

In particular the polymer composition according to this invention is characterised by the fact that it comprises from 1 to 99%, preferably from 2 to 95% and more preferably from 5 to 50% by weight of at least a first aromatic polyester (AP) substantially comprising repeating units derived from at least one heterocyclic aromatic acid having multiple functional groups originating from a renewable source, and from 99 to 1%, preferably from 98 to 5% and more preferably from 95 to 50% by weight of at least a second aromatic aliphatic polyester (AAPE).

In the meaning of this invention those products which are obtained from sources which, because of their intrinsic characteristics, regenerate or cannot be exhausted over the time scale of a human life and, by extension, whose use will not prejudice natural resources for future generations are to be regarded as being of renewable origin. The use of products of renewable origin also helps to reduce atmospheric $CO_2$ and reduces the use of non-renewable resources. A typical example of a renewable source comprises plant crops.

The AP polyester substantially comprises repeating units comprising at least one aromatic heterocyclic acid of renewable origin having multiple functional groups. The AP polyester may be of the diacid-diol type or the hydroxyacid type or mixtures of these two types. Examples of aromatic heterocyclic acids of renewable origin with multiple functional groups are acids comprising a furan ring, such as for example 2,5-furandicarboxylic acid and 5-hydroxymethyl-2-furancarboxylic acid.

As far as AP polyesters of the diacid-diol type are concerned, in addition to the aromatic acids of renewable origin with multiple functional groups the repeating units comprise diols. Examples of diols are 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, propylene glycol, neo-pentyl glycol, 2-methyl-1,3-propandiol, dianhydrosorbitol, dianhydromannitol, dianhydroiditol, cyclohexandiol, cyclohexanmethandiol and their mixtures. Among the diols 1,2-ethandiol, 1,3-propandiol and 1,4-butandiol and their mixtures are particularly preferred. In a particularly preferred embodiment the diols of the AP polyester comprise at least 40% in moles, and preferably at least 50% in moles of 1,4-butandiol in comparison with the total moles of diols.

1,2-Ethandiol, 1,3-propandiol and 1,4-butandiol can advantageously be produced from renewable sources by means of known chemical and/or biochemical processes.

In the meaning of this invention by the term "substantially comprising" is meant that the AP polyester may in addition to its base monomers optionally comprise other components in quantities such as not to alter the function and/or basic structure of the polyester. These components, for example aliphatic hydroxyacids, long molecules with two functional groups or molecules with multiple functional groups may be added either during the process of obtaining the AP polyester or during any subsequent stage of processing.

In addition to the base monomers the AP polyester may in fact include at least one aliphatic hydroxyacid in percentages not exceeding 30%, preferably not more than 20% in moles with respect to the moles of aromatic acids of renewal origin having multiple functional groups. An example of a suitable hydroxyacid is lactic acid. The hydroxyacids may be inserted in the chain as such or may be first caused to react with a monomer in the base of the AP polyester. Advantageously one or more aromatic acids with multiple functional groups, preferably of the phthalic acid type and more preferably terephthalic acid may also be added in quantities up to 49% and preferably up to 30% in moles with respect to the moles of the aromatic acids of renewable origin with multiple functional groups.

Long molecules with two functional groups and having functional groups which are not in the terminal position may also be added in quantities not exceeding 10%. Examples are dimer acids, ricinoleic acid and acids incorporating epoxy groups.

One or more molecules with multiple functional groups may also advantageously be added to the AP polyester in quantities between 0.01 and 10% in moles with respect to the quantity of dicarboxylic acids (including any hydroxyacids) in order to obtain branched products. Examples of these molecules are glycerol, pentaerythritol, trimethanol propane, citric acid, dipentaerythritol, monoanhydrosorbitol, monohydromannitol and acid triglycerides.

Amines, amino acids and amino alcohols may also be present in percentages up to 30% in moles with respect to all the other components.

The molecular weight $M_n$ of the AP polyester is preferably between 10,000 and 200,000, and more preferably between 40,000 and 150,000. The polydispersity index $M_w/M_n$ lies between 1.2 and 10 and more preferably between 1.5 and 5.

The molecular weight $M_n$ may be measured by Gel Permeation Chromatography (GPC). The determination may be performed using a chromatographic system held at 40° C., using a set of three columns in series (particle diameter 5μ and porosities of 500 Å, 1000 Å and 10,000 Å respectively), a refractive index detector, chloroform as eluent (flow 1 ml/min) and polystyrene as the reference standard.

If used for applications typical of plastics materials (such as for example bubble film formation, injection moulding, foaming, etc.) the Melt Flow Rate (MFR) of the AP polyester is preferably between 500 and 1 g/10 min, more preferably between 100 and 1 g/10 min (measurement made at 190° C./2.16 kg according to standard ASTM D1238-89 "Standard Test Method for Melt Flow Rates of Thermoplastics by Extrusion Plastometer").

Advantageously the AP polyester has an inherent viscosity (measured using an Ubbelohde viscometer for solutions having a concentration of 0.2 g/dl in $CHCl_3$ at 25° C.) of more than 0.3 dl/g, preferably between 0.3 and 1.5 dl/g.

The AP polyester is obtained according to any of the processes known in the state of the art.

In particular the polyester may advantageously be obtained through a polycondensation reaction.

Advantageously the process of polymerising the polyester may be carried out in the presence of a suitable catalyst. Organometallic compounds of tin, for example derivatives of stannoic acid, titanium compounds, for example orthobutyl titanate, aluminium compounds, for example triosopropyl Al, and compounds of antimony and zinc may for example be mentioned as suitable catalysts.

With regard to the aromatic aliphatic polyester AAPE, this preferably has an aromatic part mainly comprising at least one aromatic acid having multiple functional groups and an aliphatic part mainly comprising at least one aliphatic diacid and at least one aliphatic diol.

In the AAPE polyester by aromatic acids having multiple functional groups are meant dicarboxylic aromatic compounds of the phthalic acid type and their esters and dicarboxylic aromatic compounds of renewable origin and their esters. Particularly preferred are 2,5-furandicarboxylic acid and its esters and terephthalic acid and its esters, as well as mixtures thereof.

Preferably the AAPE polyester is biodegradable and may advantageously be selected from:

A copolyesters comprising repeating units deriving from aromatic acids of the phthalic acid type, aliphatic diacids and aliphatic diols (AAPE-A), preferably comprising from 10 to 90%, more preferably from 30 to 70% and even more preferably from 40 to 65% in moles of aromatic acids with respect to the total dicarboxylic acids content in moles;

B copolyesters comprising repeating units deriving from aromatic heterocyclic acids of renewable origin, aliphatic diacids and aliphatic diols (AAPE-B), preferably comprising from 5 to 90%, more preferably from 10 to 85%, more preferably from 20 to 80% and even more preferably from 40 to 75% in moles of aromatic with respect to the total dicarboxylic acids content in moles.

With regard to the aliphatic diacids comprising the aliphatic part of the AAPE polyester these are advantageously selected from dicarboxylic acids of the $C_2$-$C_{22}$ type. Of these adipic acids and acids of renewable origin such as for example succinic acid, suberic acid, azelaic acid, sebacic acid, dodecandioic acid and brassilic acid are preferred. Mixtures of these are also particularly preferred.

Examples of diols in the AAPE polyester are 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, propylene glycol, neo-pentyl glycol, 2-methyl-1,3-propandiol, dianhydrosorbitol, dianhydromannitol, dianhydroiditol, cyclohexandiol, cyclohexanmethandiol and their mixtures. Among the diols 1,2-ethandiol, 1,4-butandiol and their mixtures are particularly preferred. 1,2-Ethandiol and 1,4-butandiol can advantageously be produced from renewable sources by means of known chemical and/or biochemical processes.

In addition to the base monomers the AAPE polyester may contain at least one hydroxyacid in a quantity of from 0 to 49%, preferably from 0 to 30% by moles with respect to the moles of aliphatic dicarboxylic acid. Examples of suitable hydroxyacids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxyacids may be inserted into the chain as such or may also be previously caused to react with diacids or diols.

Long molecules having two functional groups and with functional groups not in the terminal position may also be added in quantities not exceeding 10%. Examples are dimer acids, ricinoleic acid and acids having epoxy groups.

Amines, amino acids and amino alcohols may also be present in percentages of up to 30% in moles with respect to all the other components.

In the process of preparing the AAPE polyester one or more molecules with multiple functional groups may advantageously be added in quantities from 0.01 to 10%, more preferably from 0.1 to 3% and even more preferably from 0.1 to 0.5% by moles with respect to the quantity of dicarboxylic acids (and any hydroxyacids) in order to obtain branched products. Examples of these molecules are glycerol, pentaerythritol, trimethylol propane, citric acid, dipentaerythritol, monoanhydrosorbitol, monohydromannitol and acid triglycerides.

The molecular weight $M_n$ of the AAPE polyester is preferably from 10,000 to 200,000, and more preferably from 40,000 to 150,000. The polydispersity index $M_w/M_n$ varies from 1.2 to 10 and more preferably from 1.5 to 5.

In the case of use for applications typical of plastics materials (such as for example bubble film formation, injection moulding, foaming, etc.) the Melt Flow Rate (MFR) for the AAPE polyester is preferably from 500 to 1 g/10 min, more preferably from 100 to 1 g/10 min (measurement performed at 190° C./2.16 kg according to standard ASTM D1238-89 "Standard Test Method for Melt Flow Rates of Thermoplastics by Extrusion Plastometer").

Advantageously the AAPE polyester has an inherent viscosity (measured using an Ubbelohde viscosity for solutions of concentration 0.2 g/dl in $CHCl_3$ at 25° C.) of from 0.3 to 1.5 dl/g.

The process of obtaining the polymer composition according to this invention may be carried out according to any of the processes known in the state of the art. In particular it may be carried out by means of extrusion, preferably by means of reactive extrusion.

The polymer composition according to this invention may also be used in a mixture with other synthetic or natural polymers, which may or may not be biodegradable. Also the said mixtures may advantageously be obtained by reactive extrusion processes.

In the case of reactive extrusion processes one or more free-radical initiators such as for example UV radiation and organic peroxides may advantageously be used. Of these, organic peroxides such as diacyl peroxides, peroxyesters, dialkyl peroxides, hydroperoxides, peroxyketals and peroxycarbonates are particularly preferred. Diacyl peroxides and dialkyl peroxides are preferred. Examples of these peroxides are benzoyl peroxide, lauroyl peroxide, isononanoyl peroxide, dicumyl peroxide, di-(t-butylperoxy isopropyl)benzene, alpha,alpha'-di-(t-butylperoxy)diisopropyl benzene, t-butyl peroxide, 2,5-dimethyl-2-5-di(t-butyl) peroxy hexane and their mixtures. The said organic peroxides are advantageously added in quantities of not more than 1% by weight, preferably less than 0.5%, and more preferably less than 0.25% with respect to the quantity of polyester (plus the other polymers in the case of blends). The person skilled in the art will then be easily in a position to decide upon the actual quantity of peroxide which will be necessary in relation to the desired characteristics of the composition.

In the meaning of this invention, by biodegradable polymers are meant biodegradable polymers according to standard EN 13432.

In particular the polymer composition according to the invention may be used in a mixture with biodegradable aliphatic polyesters of synthetic origin, of diacid-diol type, from hydroxyacid or of the polyester-ether type.

The biodegradable aliphatic polyesters from diacid-diol comprise aliphatic diacids and aliphatic diols.

The aliphatic diacids of the biodegradable polyesters may advantageously be selected from the group comprising oxalic acid, malonic acid, succinic acid, glutaric acid, adipic acid, pimelic acid, suberic acid, azelaic acid, sebacic acid, undecanoic acid, dodecanoic acid and brassilic acid, their esters and their mixtures. Of these, adipic acid and dicarboxylic acids from renewable sources are preferred, and of these dicarboxylic acids from renewable sources such as succinic acid, sebacic acid, azelaic acid, undecanoic acid, dodecanoic acid and brassilic acid and their mixtures are particularly preferred.

Examples of aliphatic diols in the biodegradable polyesters from diacid-diols are: 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentyl glycol, 2-methyl-1,3-propandiol, dianhydrosorbitol, dianhydromannitol, dianhydroiditol, cyclohexandiol, cyclohexanmethandiol and their mixtures. Butandiol, propandiol and ethylene glycol and their mixtures are particularly preferred.

Preferably the mixtures of the polymer composition according to the invention with the biodegradable polyesters from diacid diols described above are characterised by a content of the said biodegradable polyesters from diacid diols which varies within the range from 1 to 95% by weight, more preferably from 2 to 50% by weight with respect to the sum of the weights of the polymer compositions according to the invention and the latter respectively.

Among the biodegradable polyesters of hydroxyacids those preferred are: poly-L-lactic acid, poly-D-lactic acid and poly-D-L-lactic acid, poly-ε-caprolactone, polyhydroxybutyrates such as polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxy-butyrate-hexadecanoate, polyhydroxybutyrate-octadecanoate, polyalkylenesuccinates, poly 3-hydroxybutyrate-4-hydroxybutyrate.

Preferably the mixtures of the polymer composition according to the invention with the biodegradable polyesters from hydroxyacid described above are characterised by a content of the said biodegradable polyesters from hydroxyacid which varies within the range from 1 to 95% by weight, more preferably from 2 to 50% by weight with respect to the sum of the weights of the polymer compositions according to the invention and the latter respectively.

The polymer composition according to the invention may also be used in a mixture with polyolefins, non-biodegradable polyesters, urethane polyesters and polyethers, polyurethanes, polyamides, poly amino acids, polyureas, polyethers, polycarbonates, polyethylene oxide and mixtures thereof.

Among the polyolefins those preferred are polyethylene, polypropylene, their copolymers, polyvinyl alcohol, polyvinyl acetate, polyethylvinyl acetate and polyethenevinyl alcohol.

Among the biodegradable polyesters those preferred are: PET, PBT, PTT in particular with a renewable content>30% and their mixtures.

Examples of polyamides are: polyamides 6 and 6.6, polyamides 9 and 9.9, polyamides 10 and 10,10, polyamides 11 and 11,11, polyamides 12 and 12,12 and their combinations of the 6/9, 6/10, 6/11 and 6/12 type.

The polyethers may be polyethylene glycols, polypropylene glycols, polybutylene glycols, their copolymers and their mixtures having molecular weights from 70,000 to 500,000.

The polycarbonates may be polyethylene carbonates, polypropylene carbonates, polybutylene carbonates, their mixtures and copolymers.

Preferably the mixtures of the polymer composition according to the invention with the polymers described above (polyolefins, non-biodegradable polyesters, urethane polyesters and polyethers, polyurethanes, polyamides, poly amino acids, polyureas, polyethers, poly carbonates and mixtures thereof) are characterised by a content of the said polymers of from 0.5 to 99% by weight, preferably from 1 to 50% by weight with respect to the sum of the weights of the polymer composition according to the invention and the latter.

As far as the mixtures with natural polymers are concerned the polymer composition according to the invention may be used with polymers of natural origin such as for example starch, cellulose, chitin and chitosan, alginates, proteins such as glutein, zein, casein, collagen, gelatine, natural rubbers, rosinic acid and their derivatives, lignins and their derivatives. The starches and celluloses may be modified and of these mention may be made for example of esters of starch or cellulose with a degree of substitution of from 0.2 to 2.5, hydroxypropylate starches, starches modified with fatty chains. Mixtures with starch are particularly preferred. Starch may also be used in both destructured and gelatinised form or as filler. The starch may represent the continuous or the dispersed phase or may be in a co-continuous form. In the case of dispersed starch the starch is preferably in a form smaller than a micron and more preferably of average diameter smaller than 0.5 μm.

Preferably the mixtures of the polymer composition according to this invention with the polymers of natural origin described above are characterised by a content of the said polymers of natural origin which varies within the range from 1 to 99% by weight, more preferably from 2 to 50% by weight with respect to the sum of the weights of the polymer composition according to this invention and the latter respectively.

The polymer composition according to this invention may also be used in a mixture with polyesters of synthetic origin and polymers of natural origin mentioned above.

The polymer composition according to this invention has properties and viscosity values which make it suitable for use in many practical applications such as films, injection moulded manufactures, extrusion coatings, fibres, foams, thermoformed articles, etc., by suitably adjusting the corresponding molecular weight.

In particular the said composition is suitable for the production of:

- films, both mono- and bi-orientated, and multilayer films with other polymer materials;
- films for use in the agricultural sector as mulching films;
- clingfilm (stretch film) for foodstuffs, for bales in agriculture and for wrapping wastes;
- bags and linings for organic collection such as the collection of food waste and grass cuttings;
- single-layer and multi-layer thermoformed food packaging such as for example containers for milk, yoghurt, meat, drinks, etc.;
- extrusions obtained by the extrusion-coating technique;
- multilayer laminates with layers of paper, plastics materials, aluminium, metallised films;
- expanded or expandable beads for the production of parts formed by sintering;
- expanded and semi-expanded products including expanded blocks formed from pre-expanded particles;
- expanded sheets, thermoformed expanded sheets, containers obtained therefrom for food packaging;
- containers in general for fruit and vegetables;
- compounds with gelatinised, destructured and/or complexed starch, natural starch, flours, other fillers of natural origin, whether vegetable or inorganic, as fillers;
- fibres, microfibres, composite fibres with a core comprising rigid polymers such as PLA, PET, PTT, etc., and an external shell of the material according to the invention, composite fibre from blends, fibres having different cross-sections, from round to multilobate, flock fibres, woven and non-woven or spun-bonded or thermobonded fabrics for the sanitary sector, hygiene, agriculture and clothing;
- moulded articles, e.g. blow moulded, rotomoulded and injection moulded articles.

They may also be used in applications as a replacement for plasticised PVC.

The invention will now be illustrated through a number of embodiments which are intended to be purely by way of example and do not restrict the scope of protection of this patent application.

EXAMPLE 1

12 parts by weight of polybutylenefuran dicarboxylate (MFR at 190° C., 2.16 kg=32 g/10 min were mixed with 88 parts of poly(butylenefuran dicarboxylate-co-butylene sebacate) containing 70% of aromatic units with an MFR (190° C., 2.16 kg)=35 g/10 min in a Rheomix cam mixer. The mixing conditions were as follows:

mixing T=190° C.;
mixing rate=16 rpm;
mixing time=15 minutes.

The mixture so obtained was then compression moulded at 195° C. Moulding was carried out using a matrix and teflon-coated die. The moulding time was 2 minutes. The mould was then cooled with running water.

Dumbbell test specimens of type V according to standard ASTM D 638 were then obtained from the moulded material by punching. The dumbbells were then conditioned at T=23° C. and RH=55% and their mechanical properties were determined according to the above-mentioned standard after 6 days' conditioning.

| Test specimen thickness (μm) | 480 |
|---|---|
| σy (MPa) | 12.8 |
| σb (MPa) | 48.8 |
| Eb (%) | 480 |
| E (MPa) | 315 |

EXAMPLE 2

12 parts by weight of polybutylenefuran dicarboxylate (MFR at 190° C., 2.16 kg of 32.1 were mixed with 88 parts of poly(butylene terephthalate-co-butylene sebacate) containing 56% of aromatic units with an MFR (190° C., 2.16 kg)=12.5 g/10 min in a Rheomix cam mixer. The mixing conditions were as follows:

mixing T=190° C.;
mixing rate=16 rpm;
mixing time=15 minutes.

The mixture so obtained was then compression moulded at 195° C. according to the procedure described in Example 1.

Dumbbell test specimens of type V were obtained from the moulded article obtained in this way by. The dumbbells were then conditioned at T=25° C. and RH=50% and their mechanical properties were determined according to standard ASTM D 638 after 6 days' conditioning.

| Test specimen thickness (μm) | 300 |
|---|---|
| σy (MPa) | 9.6 |
| σb (MPa) | 26.8 |
| Eb (%) | 750 |
| E (MPa) | 135 |

EXAMPLE 3

40 parts by weight of polybutylenefuran dicarboxylate (MFR at 190° C., 2.16 kg of 7.5 were mixed with 60 parts of poly(butylene terephthalate-co-butylene sebacate) containing 56% of aromatic units with an MFR (190° C., 2.16 kg)=5.8 g/10 min in a Rheomix cam mixer. The mixing conditions were as follows:

mixing T=190° C.;
mixing rate=16 rpm;
mixing time=15 minutes.

The mixture so obtained was then compression moulded at 195° C. according to the procedure described in Example 1.

Dumbbell test specimens of type V were obtained from the moulded article obtained in this way by. The dumbbells were then conditioned at T=25° C. and RH=50% and their mechanical properties were determined according to standard ASTM D 638.

| Test specimen thickness (μm) | 295 |
|---|---|
| σy (MPa) | 12.3 |
| σb (MPa) | 18 |
| Eb (%) | 280 |
| E (MPa) | 280 |

EXAMPLE 4

34 parts by weight of polybutylenefuran dicarboxylate (MFR at 190° C., 2.16 kg of 7.5 were mixed with 66 parts of poly(butylene furandicarboxylate-co-butylene sebacate) containing 70% of aromatic units with an MFR (190° C., 2.16 kg)=36.2 g/10 min in a Rheomix cam mixer. The mixing conditions were as follows:
mixing T=190° C.;
mixing rate=16 rpm;
mixing time=15 minutes.

The mixture so obtained was then compression moulded at 195° C. according to the procedure described in Example 1.

Dumbbell test specimens of type V were obtained from the moulded article obtained in this way by. The dumbbells were then conditioned at T=25° C. and RH=50% and their mechanical properties were determined according to standard ASTM D 638.

| Test specimen thickness (μm) | 280 |
|---|---|
| σy (MPa) | 16.5 |
| σb (MPa) | 29.6 |
| Eb (%) | 310 |
| E (MPa) | 370 |

EXAMPLE 5

70 parts by weight of polybutylenefuran dicarboxylate (MFR at 190° C., 2.16 kg of 7.5 were mixed with 30 parts of poly(butylene terephthalate-co-butylene sebacate) containing 56% of aromatic units with an MFR (190° C., 2.16 kg)=5.8 g/10 min in a Rheomix cam mixer. The mixing conditions were as follows:
mixing T=190° C.;
mixing rate=16 rpm;
mixing time=15 minutes.

The mixture so obtained was then compression moulded at 195° C. according to the procedure described in Example 1.

Dumbbell test specimens of type V were obtained from the moulded article obtained in this way by. The dumbbells were then conditioned at T=25° C. and RH=50% and their mechanical properties were determined according to standard ASTM D 638.

| Test specimen thickness (μm) | 165 |
|---|---|
| σy (MPa) | 36 |
| σb (MPa) | 36.2 |
| Eb (%) | 225 |
| E (MPa) | 1370 |

COMPARISON EXAMPLE 1

12 parts by weight of poly-L-lactic acid (Mn 130,000, MFR at 190° C., 2.16 kg=3.5 g/10 min, lactide residue less than 0.2% and D isomer content approximately 6%) were mixed with 88 parts of poly(butylene terephthalate-co-butylene sebacate) containing 56% of aromatic units with an MFR (190° C., 2.16 kg)=12.5 g/10 min in a Rheomix cam mixer. The mixing conditions were as follows:
mixing T=190° C.;
mixing rate=16 rpm;
mixing time=15 minutes.

The mixture so obtained was then compression moulded at 195° C. according to the procedure described in Example 1.

Dumbbell test specimens of type V were obtained from the moulded article so obtained by punching. The dumbbells were then conditioned at T=25° C. and RH=50% and their mechanical properties were determined according to standard ASTM D 638 after 6 days' conditioning.

| Test specimen thickness (μm) | 400 |
|---|---|
| σy (MPa) | 9.2 |
| σb (MPa) | 19 |
| Eb (%) | 720 |
| E (MPa) | 125 |

The invention claimed is:

1. A polymeric composition which comprises:
   A. from 10-70% by weight of at least one aromatic polyester (AP) comprising
      a1) units derived from a diol component selected from 1,4-butanediol and 1,2-ethanediol; and
      a2) units derived from an acid component, said units derived from said acid component comprising from 70 to 100 mol % of repeating units deriving from at least one heterocyclic polyfunctional aromatic acid of renewable origin selected from the group consisting of 2,5-furandicarboxylic acid and 5-hydroxymethyl-2-furancarboxylic acid,
      and said at least one aromatic polyester (AP) having a molecular weight $M_n$ from 40,000 to 150,000 and a polydispersity index KAI, from 1.5 to 5; and
   B. from 90-30% by weight of at least a biodegradable aliphatic-aromatic polyester (AAPE) comprising:
      b1) units deriving from at least one dicarboxylic aromatic compound selected from the group consisting of (C) and (D); wherein said (C) is at least one of an aromatic acid of the phthalic acid type and ester thereof; and said (D) is at least one of 2,5-furandicarboxylic acid and ester thereof; and aliphatic units deriving from the group consisting of adipic acid, succinic acid, suberic acid, azelaic acid, sebacic acid, dodecandioic acid, brassylic acid, and mixtures thereof; and wherein said (C) comprises from 40 to 75 mol % of units deriving from said phthalic acid type and ester thereof with respect to the total molar diacid content; and said (D) comprises from 30 to 70 mol % of units deriving from said 2,5-furandicarboxylic acid and ester thereof with respect to the total molar diacid content;
      b2) units derived from 1,4-butanediol; said aliphatic-aromatic polyester (AAPE) having a molecular weight $M_n$ from 40,000 to 150,000 and a polydispersity index $M_w/M_n$ from 1.5 to 5.

2. The polymeric composition according to claim 1, in mixture with polyolefins, non-biodegradable polyesters, polyester- and polyether-urethanes, polyurethanes, polyamides, polyaminoacids, polyureas, polyethers, polycarbonates, polyethylene oxide and mixtures thereof.

3. The polymeric composition according to claim 1, in mixture with one or more biodegradable polymers of synthetic or natural origin.

4. A mixture comprising the polymeric composition according to claim 3 and one or more biodegradable polymers of synthetic or natural origin, wherein said biodegradable polymers of synthetic origin are aliphatic polyesters of the diacid-diol, of the hydroxyacid or of the polyester-ether type.

5. A mixture comprising the polymeric composition according to claim 3 and one or more biodegradable polymer of synthetic or natural origin, wherein said biodegradable polymers of natural origin are starch, cellulose, chitin, chitosan, alginates, proteins, natural rubbers, rosinic acid and its derivatives, lignins and derivatives thereof.

6. A mixture according to claim 5, wherein said starch is used in destructurized, gelatinized or in filler form.

7. The polymeric composition according to claim 1 or a mixture of said polymeric composition with one or more biodegradable polymers of synthetic or natural origin, wherein said biodegradable polymers of synthetic origin are aliphatic polyesters of the diacid-diol, of the hydroxyacid or of the polyester-ether type, which is in the form of a mono- or bi-oriented film, and a film multilayered with another polymeric material;

cling films;

a bag or bin liner for organic waste collection;

mono- and multi-layered thermoformed foodstuff packaging, a coating obtained using extrusion coating;

a multilayer laminate with a layer of paper, plastic, aluminium, or metallized films;

expanded or expandable beads for the production of pieces obtained by sintering;

expanded and semi-expanded products;

foam sheets, and containers obtained from foam sheets for use in foodstuff packaging;

fruit and vegetable containers;

composites with at least one of gelatinised, destructured, complexed starch, natural starch, flours, vegetable fillers and inorganic natural fillers;

fibres, microfibers, composite microfibers wherein the core is constituted by rigid polymers and the shell is constituted by said biodegradable polyester, blend composite fibres, fibres with different sections, from circular to multilobed, stample fibres, woven and non-woven fabrics or spun bonded or thermobonded for use in sanitary and hygiene products, and in the agricultural and clothing sectors; and molded articles.

\* \* \* \* \*